Feb. 7, 1961     K. WESTPHALEN     2,971,106
INDUCTION MOTORS
Filed Nov. 28, 1958                       4 Sheets-Sheet 1
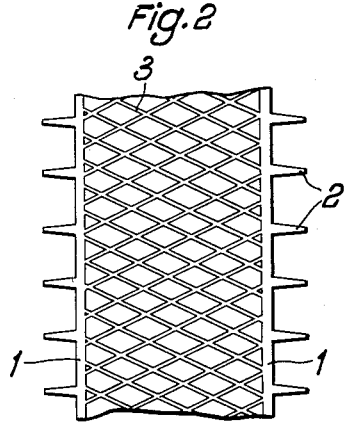
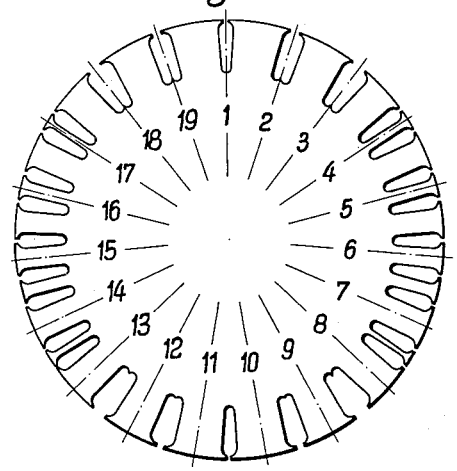
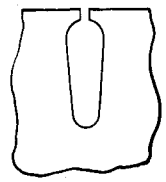
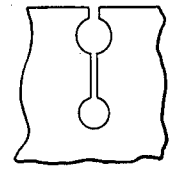
*Inventor:*
KURT WESTPHALEN
BY
PATENT AGENT Feb. 7, 1961 K. WESTPHALEN 2,971,106
INDUCTION MOTORS
Filed Nov. 28, 1958 4 Sheets-Sheet 2
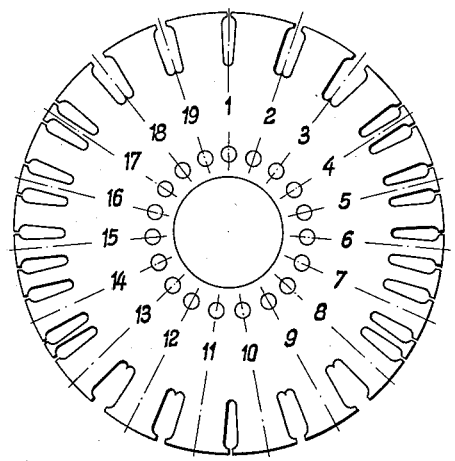
Fig. 3
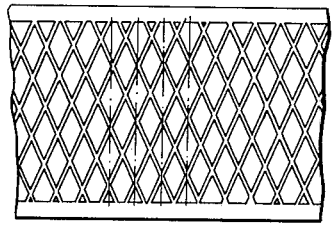
Fig. 3a
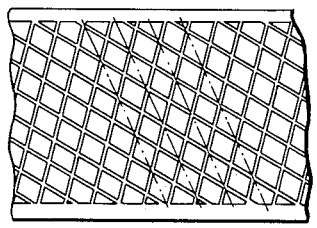
Fig. 3b
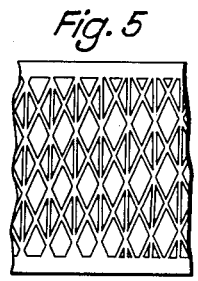
Fig. 5
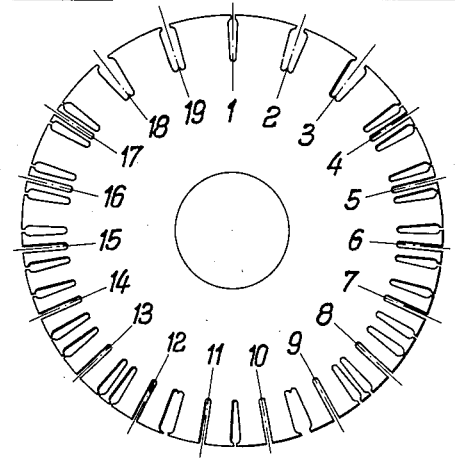
Fig. 4
Fig. 6
Inventor:
KURT WESTPHALEN
BY
PATENT AGENT Feb. 7, 1961 K. WESTPHALEN 2,971,106
INDUCTION MOTORS
Filed Nov. 28, 1958 4 Sheets-Sheet 4

Inventor:
KURT WESTPHALEN
BY
PATENT AGENT

United States Patent Office 2,971,106
Patented Feb. 7, 1961

2,971,106
INDUCTION MOTORS

Kurt Westphalen, Wedeler Landstrasse 101,
Hamburg-Rissen, Germany

Filed Nov. 28, 1958, Ser. No. 777,035

Claims priority, application Germany Dec. 5, 1957

12 Claims. (Cl. 310—166)

This invention relates to induction motors and, more particularly, to improvements in the distribution of conductors in the rotors of squirrel-cage type motors.

In induction motors, higher-order harmonics appear which cause noises and parasitic moments of rotation. It has been known to suppress higher harmonics by short-pitching the stator winding or by a suitable selection of the number of slots of the stator with respect to the slots of the rotor, or by axial subdivision of the rotor itself, such that adjacent rotor elements are staggered with respect to one another in the circumferential direction, or other means, providing a slanting arrangement of the stator and/or rotor slots. If these slots are sufficiently slanted, all of the harmonics of certain orders are made to be practically zero, while the leakage becomes very large and, therefore, the pull-out torque and the power factor very small, so that the usefulness of such slanting is limited. Therefore, the slanting arrangement is mostly provided in such a manner that only one particular harmonic is rendered ineffective and, usually, a slanting arrangement of the stator slots is used which suppresses the most detrimental slot harmonic.

It is an object of the present invention to provide a short-circuited rotor for A.C. motors or brakes, in which the conductors are arranged in a cylindrical layer which is coaxial with the rotor axis and in which the action of the harmonics is reduced to a greater extent than heretofore.

It is another object of the present invention to provide a system of conductors comprising at least two annular series of conductors interlaced with one another, wherein at least the conductors of one of these series are slanted so as to run obliquely of the axis.

It is a further object of the invention to provide a squirrel-cage rotor composed of laminations which are identical with respect to one another and wherein two different series of slots are disposed in the same annular zone, and the slot distributions in each series are uniform.

It is possible to manufacture such sheets or laminations in a very simple manner according to the Tipp-punching method, using a multi-step operation, this method being very quick and inexpensive. This method is also suitable for small production and can even be used in case of individual manufacture, for example, when making experimental models. In case of larger manufacturing runs on laminations, single-step or sequence punching methods are preferable.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 1 is a view of a rotor lamination according to the present invention;

Figure 1a is an enlarged partial view, showing one slot shape of a lamination;

Figure 1b is an enlarged partial view, showing an alternative slot shape for a lamination;

Figure 2 is a developed view of a rotor according to the present invention;

Figure 3 is a view of a modified rotor lamination according to the invention;

Figure 3a is a developed view of a rotor similar to that shown in Figure 2;

Figure 3b is a developed view of a rotor modified with respect to that shown in Figure 3a;

Figure 4 is a view of a still further modified rotor lamination according to the invention;

Figure 5 is a developed view of a rotor of the type shown in Figure 4;

Figure 6 is a developed view of a modified rotor of the type shown in Figure 4;

Figure 7:
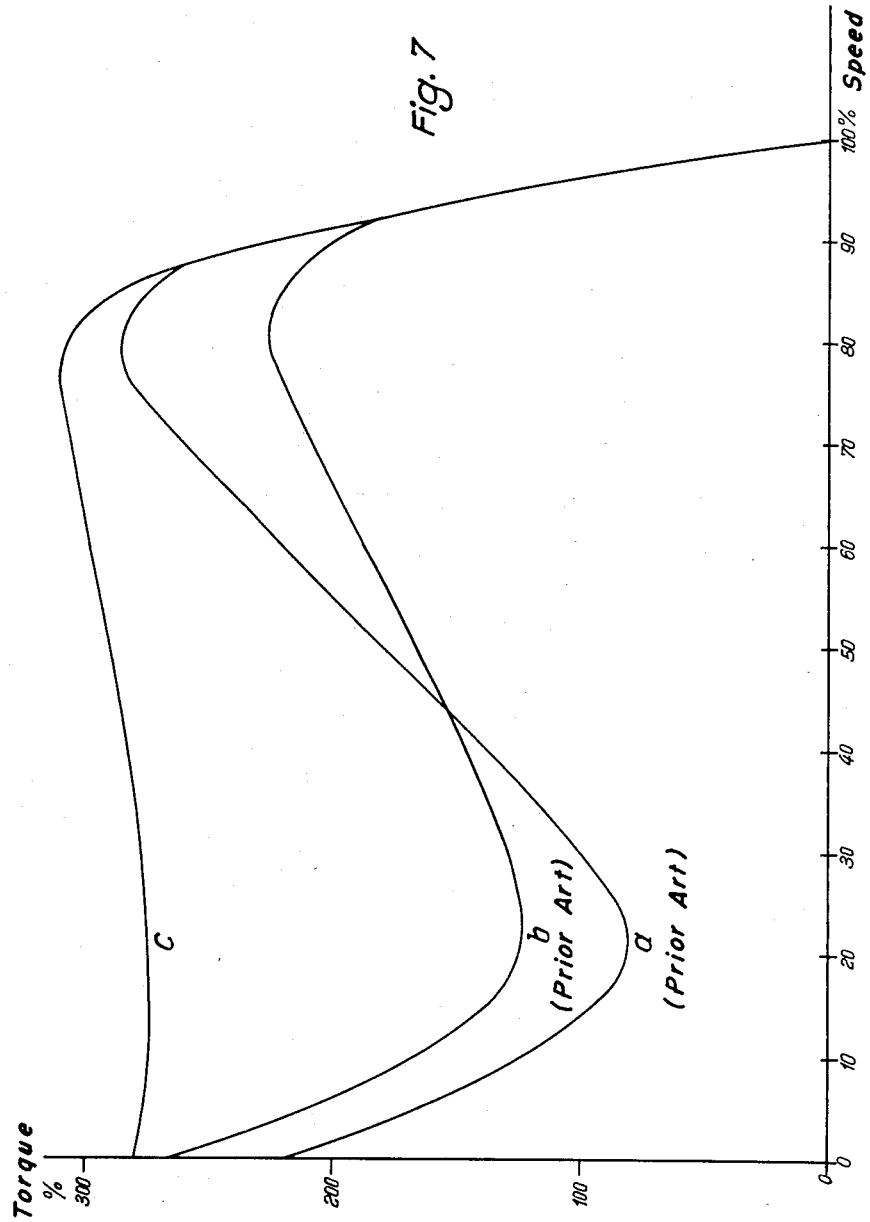
Figure 7 is a graphical representation of torque speed curves for various types of induction motors.

In the lamination shown in Figure 1, a slot series of $N_1=18$ slots uniformly distributed at the circumference is first punched in accordance with the Tipp-method, said slots having a cross section as shown in Figure 1a. Thereafter, a second slot series of $N_2=20$ slots uniformly distributed around the circumference is punched, beginning with slot No. 1, said second slot series occupying the same annular portion of the lamination as the first series. If such laminations are stacked, so that they are staggered or displaced to the extent of $1/19$ of the circumference, a rotor is obtained in which, after injection-molding or casting of the conductors in the slots, a conductor lattice slanting towards the right and a conductor lattice slanting towards the left side are interlaced in the same cylindrical zone, and an orthorhombic conductor system is obtained. Figure 2 shows the development of a rotor in which the outer short circuit rings are denoted by 1, the cooling ribs associated or attached thereto are denoted by 2, and the mutually interlaced conductor lattices are denoted by 3.

The slants of the two conductor lattices with respect to one another can be varied by staggering the laminations during stacking either individually or in groups. Furthermore, the conductor system may be distributed such, that the two conductor lattices have different slants with respect to the stator. If, for example, with the lamination shown in Figure 1, the sheets are staggered by $1/21$ of the circumference rather than $1/19$, as described with respect to Figure 1, two right-slanting conductor lattices are obtained instead of a right-slanting and a left-slanting conductor system. Thus, it is possible to give one conductor lattice a right-slant of a certain number of stator slot divisions and the other conductor lattice a right-slant of different number of stator slot divisions. Likewise, in this case, a short-circuited winding system is obtained and it is possible to suppress harmonics of different orders by providing different slants. The design of left slanting and right slanting conductor lattices has the advantage of simple manufacture, although, it is not absolutely necessary for obtaining the intended effect.

According to Figure 1, all of the slots have a cross-sectional shape which is shown on an enlarged scale in Figure 1a. A further improvement in starting of the motor is obtained according to another feature of the present invention by designing the slots as dual slots according to Figure 1b in such a manner, that two pairs of conductor lattices arranged coaxially with respect to one another are provided, wherein the conductor lattices are interlaced in each of the cylindrical zones. In such cases, the conductors associated with the outer conductor lattice are suitably given different starting characteristics so that, for example, one of the conductor lattices has a high resistance and the other a low resistance. This can be done, for example, by designing the outer slot series with slots of different shape or size, resulting in different cross sectional areas and, thereby, in different resistance of the conductors and in different skin effects.

It has been known to use locating holes to facilitate the stacking of the sheets, i.e., to insert socalled locating pins in the holes, said pins being removed after assembly. Since the holes, depending upon the degree of the slant, are arranged more or less helically, it will be necessary to give the locating pins a predetermined helical form. Such provision is unsatisfactory for reasons of manufacture, particularly, in the case of a large slant, because the helical shape of the pins should be very precise.

This disadvantage is avoided according to another feature of the invention by punching a series of holes in the core sheets, said holes being adapted to receive the locating pins. The number of holes is suitably selected as an integer between the number of slots of the two slot series or as the total of the two slot numbers. As a result of this, it is possible to use entirely straight locating pins, independent of the degree of slant of the conductor lattices.

Figure 3 shows a lamination in which two slot lattices with the slot numbers $N_1$ and $N_2$ are provided in the same annular zone as shown in Figure 1. A further series of locating holes is provided close to the rotor shaft, i.e., at a zone where the cross section is not weakened, said holes being adapted to receive the locating pins. If, for example, as shown in Figure 1, a slot number $N_1$ of 18 slots is used for one of the slot lattices and a slot number $N_2$ of 20 slots for the other lattice, the locating holes will include $$\frac{N_1+N_2}{2}$$

i.e., a total of 19 holes. These holes are circular so that pins of circular section can be employed. If, during stacking of the rotor stack, each successive sheet is staggered by one locating hole toward the right, there is obtained a right-staggered slot series for the slot number $N_1$, and an equally staggered left slot series for the slot number $N_2$ (see Figure 3a). It is possible to vary the degree of the slant of the two interlaced conductor lattices by providing a slight slant of the locating holes, for example, by one or approximately one stator slot division with respect to the axis, whereby the stacking pins can be made straight, because the latter have a slight play in the locating holes, as illustrated in Figure 3b. The axes of some of the holes are indicated as dash-dot lines in Figures 3a and 3b. By twisting the stack through approximately one stator slot division, particularly undesirable harmonics of the slots can be rendered ineffective.

In case of larger rotors, the locating holes may be provided in the same zone in which the two other slot series are disposed. A lamination designed in this manner is shown in Figure 4, in which the locating holes are narrower than the slots. It is possible to use round locating holes in place of elongated holes, as shown in Figure 4. After removing the stacking pins from the stack, the locating holes are likewise filled with conductive material, for example, by injection molding and, therefore, form an active part of the electric conductor system. In case $$\frac{N_1+N_2}{2}$$

holes are used, every other conductor system is crossed diagonally in the axial direction by filling the locating holes with metal, as shown in Figure 5. This arrangement of the locating holes has not only the advantage that straight pins can be used, but the electric operation of the motor is also improved, as described in the foregoing, due to the finer slot division of the conductor system. The electric operation of the motor can be further improved by selecting the number of locating holes to equal $N_1+N_2$, if the size of the rotor permits this selection, rather than $$\frac{N_1+N_2}{2}$$

If the locating holes are then filled with conductive material, each rhombus of the system is crossed in the axial direction, as shown in Figure 6. In this case, the staggering during stacking has to be from lamination to lamination by two hole divisions.

In case of an exterior locating hole series, a hole number is preferably selected which equals the arithmetic mean value of the slot numbers of the two slot lattices or equals the total thereof, because the conductors formed by casting in these locating holes will comprise the diagonals of the rhombuses formed by the other conductor lattices. However, in case of a large difference in the slot numbers of the two lattices and in case of an inner series of locating holes, it is possible to select a number for the latter which is an integer between the slot numbers, i.e., in case of slot numbers of, for example, 40 and 44 slots, the locating hole number may be 41 or 43 in addition to 42 and 84. In case of staggering of the sheets by one locating hole division and straight locating pins, two conductor lattices having the same slanting degree with respect to one another may have different slants with respect to the rotor axis.

Figure 7 shows three curves of the moment of rotation, torque, versus rate of rotation in percent of the synchronous speed, said characteristics being obtained from a motor with three different rotors. The stator of this motor has 36 slots and its winding is designed as a conventional pole winding with concentric coils of unequal width. Thus, the field energizing curve contains all of the odd-numbered harmonics, except those harmonics which are divisible by three. Curve $a$ shows the behavior of a conventional short circuit rotor having 46 slots according to Figure 1a, curve $b$ shows the behavior of a conventional dual slot rotor having likewise 46 slots according to Figure 1b, and curve $c$ shows the behavior of a rotor designed in accordance with the invention, wherein the shape of the slots is the same as the rotor of the curve $a$ and the total slot number $N_1+N_2$ is likewise 46, while $N_1=22$ and $N_2=24$.

By comparing the curves, it can be seen that the rotor according to the invention has a straight starting curve with increased pull-out torque and, therefore, is particularly suited for motors requiring starting with a high torque, or for motors which are intermittently operated, for example, braking motors.

Braking motors are generally motors in which after de-energization a mechanical brake is automatically operated. Such motors are mostly operated interruptedly with a high number of interruptions, i.e., the motor is stopped frequently and then has to run again at high speed. In case of a great number of interruptions, the motor will not reach its rated speed, so that the heat developed depends only on the magnitude of the initial current and the running time of the motor, i.e., from the electric energy received during acceleration; while the value or magnitude of the full or normal load is of lesser importance. Therefore, a substantial decrease in the heat can be obtained if the acceleration time is short and the initial current is low. This requirement is not fulfilled in known braking motors.

In known dual-slot rotors, the starting torque is increased due to the increase in resistance of the rotor which, in turn, is obtained as a result of the skin effect. However, this advantage is accompanied by a decrease in the pull-out torque, due to the increase in leakage becoming effective during running of the motor (see Figure 7, curve b).

This disadvantage does not occur if a rotor designed in accordance with the invention is used. The leakage is decreased even with respect to that of a conventional one-slot rotor as a result of the lattice arrangement of the short-circuit windings, so that the pull-out torque is higher than in case of such one-slot rotor. In addition to this, dipping of the torque curve is substantially avoided, due to the suppression of harmonics, so that a strong torque is available during the entire interval of acceleration. If, in addition to this, the curve is raised in the lower speed range, this can be obtained by increasing the rotor resistance.

Figure 8:
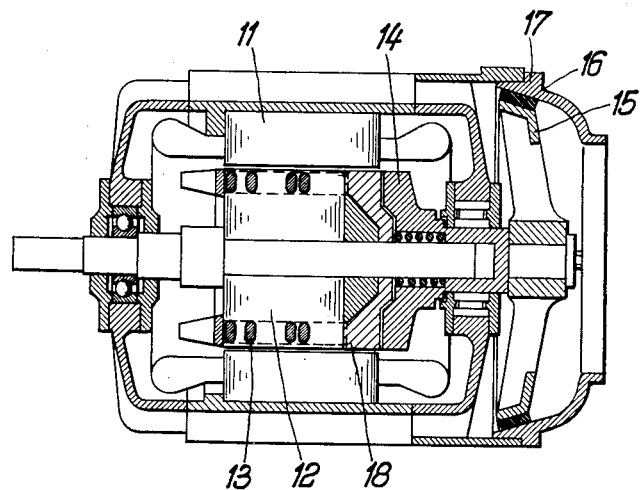
Figure 8 is a longitudinal section view taken through a braking motor according to the invention.
Figure 9:
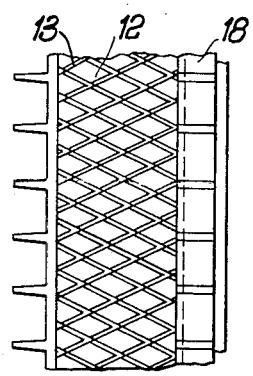
Figure 9 is a developed view of the rotor in the motor shown in Figure 8.

Figure 8 shows a brake motor, the development of the rotor of this motor being illustrated in Figure 9. The stator of the motor is denoted by 11, while the squirrel-cage rotor is designated by 12, said rotor having a winding 13 forming two lattices. An armature 14, controlled or actuated by a brake deflection member 18 of the rotor 12, is mounted on the rotor shaft in such a manner that it can be axially displaced thereon. When the motor is standing still, the brake cone member 15, controlled by the armature and having a brake lining 16, engages a stationary brake surface 17 forming a part of the stator. If the motor is switched on, the component of the magnetic flux in the stator, which component is deflected by the deflecting member 18 in the radial direction, attracts the armature 14, so that the braking cone member 15 with its brake lining 16 is lifted from the stationary brake surface 17.

As a result of the lattice formation of the rotor windings, the flux is forced out from the part of the rotor enclosed by the winding at the instant of switching-on to a greater extent than in the known motors, so that the torque of the present motor is higher than that of known motors, because a larger proportion of the flux passes to the armature via the deflection member.

I claim:

1. In an alternating current induction motor of the squirrel-cage type having a rotor formed with slots disposed across the rotor in a cylindrical zone concentric with the axis of the rotor and having short-circuited conductor lattices in said slots, the slots and conductors being arranged in at least two distinct annular series, the number of slots and conductors in each annular series being different and the conductors of the series being mutually connected together where they intersect, and the conductors of at least one of the lattices being slanted at a constant angle with respect to the rotor axis.

2. In a motor according to claim 1, and having slots defining stator poles, the respective conductors of the two lattices each having a different slant with respect to the direction of the stator slots.

3. In a motor according to claim 1, the rotor comprising laminations which are identical and in which two lattices are provided disposed in the same cylindrical zone, each lattice having an integral number of uniformly distributed slots and said integral numbers of the two lattices being different with respect to one another.

4. In a motor according to claim 3, the slots of the two separate lattices being located in said zone at two different diameters to form inner and outer concentric series of slots arranged coaxially with respect to one another and mutually adjacent, whereby the conductors lying in the two concentric series intersect one another.

5. In a motor according to claim 3, each lamination having an annular series of locating holes, said holes being adapted to receive locating pins during stacking of the laminations.

6. In a motor according to claim 5, the number of locating holes in the series being equal to an integer between the numbers of slots in the two series of slots.

7. In a motor according to claim 5, the number of locating holes in the series being equal to the arithmetic mean value of the numbers of slots of the two series of slots.

8. In a motor according to claim 5, the number of locating holes in the series being equal to the total number of slots in the two slot series.

9. In a motor according to claim 5, the annular series of locating holes occupying a zone close to the shaft.

10. In a motor according to claim 9, said locating holes comprising round holes.

11. In a motor according to claim 5, said locating holes occupying the same annular zone as said slots.

12. In a motor according to claim 1, said rotor comprising a plurality of stacked laminations having their locating holes substantially aligned and the stacked laminations being circumferentially twisted by approximately one rotor slot division.

References Cited in the file of this patent

UNITED STATES PATENTS

| | | |
|---|---|---|
| 2,274,070 | Kauders | Feb. 24, 1942 |
| 2,758,228 | Dunn et al. | Aug. 7, 1956 |
| 2,788,458 | Naul | Apr. 9, 1957 |